United States Patent
Nilson

(10) Patent No.: US 11,845,650 B2
(45) Date of Patent: Dec. 19, 2023

(54) COMPOSITE CUSHIONS

(71) Applicant: Joseph T. Nilson, Alpine, UT (US)

(72) Inventor: Joseph T. Nilson, Alpine, UT (US)

(*) Notice: Subject to any disclaimer, the term of this patent is extended or adjusted under 35 U.S.C. 154(b) by 0 days.

(21) Appl. No.: 17/863,305

(22) Filed: Jul. 12, 2022

(65) Prior Publication Data
US 2023/0002212 A1  Jan. 5, 2023

Related U.S. Application Data

(63) Continuation of application No. 17/147,287, filed on Jan. 12, 2021, now Pat. No. 11,383,969, which is a continuation of application No. 15/898,219, filed on Feb. 15, 2018, now Pat. No. 10,889,489.

(60) Provisional application No. 62/459,518, filed on Feb. 15, 2017.

(51) Int. Cl.
*B68G 5/00* (2006.01)
*B68G 7/00* (2006.01)
*B29K 105/04* (2006.01)
*B29C 44/12* (2006.01)
*B29L 31/00* (2006.01)

(52) U.S. Cl.
CPC ................ *B68G 5/00* (2013.01); *B68G 7/00* (2013.01); *B29C 44/1271* (2013.01); *B29K 2105/04* (2013.01); *B29L 2031/751* (2013.01)

(58) Field of Classification Search
CPC ........ B68G 5/00; B68G 7/00; B29C 44/1271; B29K 2105/04; B29L 2031/751
See application file for complete search history.

(56) References Cited

U.S. PATENT DOCUMENTS

| | | | |
|---|---|---|---|
| 4,726,086 A * | 2/1988 | McEvoy | A47C 7/18 249/166 |
| 7,996,940 B1 * | 8/2011 | Dahm | A47C 27/082 297/452.41 |
| 8,990,985 B1 * | 3/2015 | Wilhelm | B60N 2/7017 5/653 |

* cited by examiner

*Primary Examiner* — Fredrick C Conley
(74) *Attorney, Agent, or Firm* — DENTONS Durham Jones Pinegar

(57) ABSTRACT

A composite cushion includes a first cushioning element and a second cushioning element. The second cushioning element is formed in a manner that engages a peripheral engagement are of the first cushioning element to interlock the second cushioning element onto the first cushioning element. The second cushioning element may surround an outer periphery of the first cushioning element. In addition, a portion of the second cushioning element may be superimposed over a central cushioning area of the first cushioning element. Any superimposed central portions of the first and second cushioning elements may have an unsecured relationship (i.e., they are not directly secured to each other).

20 Claims, 3 Drawing Sheets

COMPOSITE CUSHIONS

CROSS-REFERENCE TO RELATED APPLICATION

This application is a continuation of U.S. patent application Ser. No. 17/147,287, filed on Jan. 12, 2021 and titled COMPOSITE CUSHIONS ("the '287 application"), now U.S. Pat. No. 11,383,969, issued Jul. 12, 2022, which is a continuation of U.S. patent application Ser. No. 15/898,219, filed on Feb. 15, 2018 and titled COMPOSITE CUSHIONS ("the '219 application"), now U.S. Pat. No. 10,889,489, issued Jan. 12, 2021, which claims the benefit of priority to the Feb. 15, 2017 filing date of U.S. Provisional Patent Application No. 62/459,518, titled COMPOSITE CUSHIONS ("the '518 Provisional Application"), is hereby made pursuant to 35 U.S.C. § 119(e). The entire disclosures of the '287 application, the '219 application and the '518 Provisional Application are hereby incorporated herein.

TECHNICAL FIELD

This disclosure relates generally to composite cushions and, more specifically, to cushions that include a first cushioning element that defines a plurality of columnar cushioning cells and a second cushioning element that is positioned adjacent to and mechanically engages engagement features of the first cushioning element.

DISCLOSURE

In various aspects, this disclosure relates to composite cushions, including, but not limited to, the composite cushions themselves, as well as to methods for fabricating composite cushions and methods for using composite cushions.

A composite cushion according to this disclosure includes a first cushioning element and a second cushioning element. The first cushioning element includes a central cushioning area and a peripheral engagement area, which is located outside of and adjacent to at least a portion of the outer periphery of the first cushioning element.

The first cushioning element, which is defined from a first cushioning material, may include walls that define an outer periphery of the first cushioning structure, as well as columnar cushioning cells. The columnar cushioning cells may be arranged in an array. The first cushioning material, as well as the thicknesses of the walls, may enable the columnar cushioning cells to buckle. A first surface of the central cushioning area may be defined by first ends of the walls and coincide with first ends of the columnar cushioning cells. A second surface of the central cushioning area, which is opposite from the first surface, may be defined by second ends of the walls and coincide with second ends of the columnar cushioning cells, which second ends are opposite from the first ends of the columnar cushioning cells. A distance (or distances) between the first surface and the second surface of the central cushioning area define a thickness (or thicknesses, or an average thickness) of the first cushioning element. The thickness of the central cushioning area may be referred to as a "cushioning thickness" of the first cushioning element.

Without limiting the scope of this disclosure, the central cushioning area of the first cushioning element may be configured and/or made in the same manners as the cushions described by any of U.S. Pat. Nos. 5,749,111, 6,026,527, 6,413,458, 7,666,341, 8,424,137, 8,434,748, 8,628,067, 8,919,750, and 8,932,692, the entire disclosures of which are hereby incorporated herein.

The peripheral engagement area of the first cushioning element may be formed integrally with the central cushioning area of the first cushioning element and, thus, from the same material as that used to form the central cushioning area (e.g., the first cushioning material, etc.). The peripheral engagement area may be located outside of and adjacent to at least a portion of an outer periphery of the central cushioning area. In some embodiments, the peripheral engagement area may include engagement features that are spaced apart from one another at various locations outside of the central cushioning area. In other embodiments, the peripheral engagement area may surround at least a portion of central cushioning area; e.g., it may comprise at least one continuous structure that is positioned adjacent to at least portions of two or more sides of the central cushioning area (e.g., at least portions of two sides, one side and at least portions of two connecting sides, two sides and at least portions of two connecting sides, etc.). In still other embodiments, the peripheral engagement area may completely surround the central cushioning area.

The engagement features of the peripheral engagement area of the first cushioning element may comprise any feature that can be mechanically engaged by corresponding, even complementary, features of the second cushioning element. The engagement features may comprise engagement cells, which may be defined by one or more walls. Engagement cells may comprise full cells, the entire peripheries of which are defined by one or more walls that may be longitude when the first cushioning element is oriented horizontally, or partial cells, in which one or more of the walls that define the engagement cell that lacks at least a portion of at least one wall (e.g., includes an opening (e.g., a gap along the height of the engagement cell, etc.)) or that is capable of being opened (e.g., comprise a gap or a cut that defines a flap, etc.). The walls of the cells, whether full or partial, may be solid (i.e., they may lack openings, or "windows") or they may include openings. The first cushioning material of the peripheral engagement area may define flanges and other structures that may be configured to be securely engaged by corresponding, even complementary, features of the second cushioning element. In any event, portions of the second cushioning element that engage the peripheral engagement area of the first cushioning element may overlie (i.e., cover an upper surface of) the peripheral engagement area, underlie (i.e., cover a lower surface of) the peripheral engagement area, or overlie and underlie (i.e., cover upper and lower surfaces of) the peripheral engagement area.

A thickness (or thicknesses or an average thickness) of the peripheral engagement area, which may be referred to as an "engagement thickness" of the first cushioning element, may be defined by a distance (or distances) between a first surface of the peripheral engagement area and an opposite, second surface of the peripheral engagement area. The first and second surfaces of the peripheral engagement area may correspond to (e.g., face in the same general directions as, be continuous with, etc.) the first and second surfaces of the cushioning area.

In some embodiments, including those where the second cushioning element is thicker than the first cushioning element or increases a thickness of the composite cushion, the engagement thickness of the peripheral engagement area of the first cushioning element may be less than, substantially the same as, or the same as the cushioning thickness of the central cushioning area of the first cushioning element. In embodiments where the second cushioning element has a thickness that is the same as or about the same as the thickness of the first cushioning element or the thickness of the second cushioning element will not contribute to the thickness of the composite cushion or will not significantly increase the thickness of the composite cushion, the engagement thickness may be less than the cushioning thickness.

The first cushioning material of the first cushioning element may comprise any suitable cushioning material. Without limitation, the first cushioning material may comprise a suitable elastic, resilient material or a suitable viscoelastic material. The first cushioning material may define walls that are solid, open-celled, close-celled (e.g., cells that are defined only by the first cushioning material; cells that are defined by microspheres, microcapsules, etc.; etc.), or walls that have other configurations. Some nonlimiting examples of gel materials that may be used as the first cushioning material are disclosed by U.S. Pat. Nos. 5,994,450 and 7,964,664, the entire disclosures of which are hereby incorporated herein. These types of materials are relatively heavy.

The second cushioning element of a composite cushion according to this disclosure, which is positioned adjacent to the first cushioning element and may partially or completely laterally surround the first cushioning element, may mechanically engage engagement features of the first cushioning element. In this regard, the second cushioning element may be formed complementarily to, and even formed on, the peripheral cushioning area of the first cushioning element. In specific embodiments, a second cushioning material of the second cushioning element may extend into and even through engagement cells of the peripheral engagement area of the first cushioning element, interlocking the second cushioning element and the first cushioning element.

The second cushioning material of the second cushioning element of a composite cushion according to this disclosure may be the same as the first cushioning material of the first cushioning element or different from the first cushioning material of the first cushioning element. In some embodiments, the second cushioning material may comprise a lightweight cushioning material. The use of materials that are relatively light in conjunction with a relatively heavy first cushioning element to form a composite cushion may provide for a relatively lightweight cushion when compared with the weight of a cushion that is made primarily from or completely from the relatively heavy first cushioning material, while providing for a composite cushion that provides the benefits of a cushion made from the first cushioning material and having the configuration of the first cushioning element. The second cushioning material may also provide the composite cushion with a desired shape, which the first cushioning material may or may not be able to provide. A wide variety of materials may be used to form the second cushioning element of a composite cushion according to this disclosure.

In some embodiments, the second cushioning element of a composite cushion may be located adjacent to or at least partially surround the first cushioning element of the composite cushion, with both major surfaces (i.e., the first and second surfaces) of the first cushioning element remaining exposed. In some of those embodiments, where the second cushioning element completely surrounds an outer periphery of the first cushioning element, the second cushioning element may serve as a "racetrack" around the first cushioning element.

In embodiments where one or both major surfaces of the first cushioning element remain exposed, edges of corresponding surfaces of the first and second cushioning elements may be flush or substantially flush, imparting the composite cushion with a continuous surface. Such a continuous surface may be flat, or it may have a contour.

In other embodiments, a composite cushion may include a second cushioning element that extends over at least a portion, or even an entirety of, at least one major surface of a central cushioning area of a first cushioning element. In such an embodiment, a relief layer may be positioned between superimposed portions of the central cushioning area of the first cushioning element and the second cushioning element. The relief layer may comprise any suitable flexible sheet, such as a cloth (e.g., a non-stretch cloth, a two-way stretchable cloth, a four-way stretchable cloth, etc.), a sheet of another material (e.g., polymer, quasi-woven polymer, woven polymer, etc.), etc. The relief layer may be positioned against, but not adhered or otherwise secured to the surface of the central cushioning area of the first cushioning element, which may enable the superimposed portions of the central cushioning area and the second cushioning element to move somewhat independently of one another. Such an arrangement may enable each of the first cushioning element and the second cushioning element to function in a desired manner (e.g., substantially constant cushioning and resistance across the second cushioning element; buckling of the first cushioning element under focused forces, while providing support to distributed forces; etc.) without significant interference from one another (e.g., the ability of the first cushioning element to buckle at locations where forces are focused will not be significantly diminished by a scrim that has been adhered or otherwise secured to the first cushioning element to prevent the second cushioning material from entering into the columnar cushioning cells of the first cushioning element when the second cushioning element is formed or secured to the first cushioning element, etc.).

Alternatively, portions of a second cushioning element that overlie all or part of the central cushioning area of a first cushioning element may directly contact the central cushioning area of the first cushioning element. For example, ends (e.g., top ends, etc.) of at least some cells of the central cushioning area of the first cushioning element may be at least partially closed (e.g., by a membrane, etc.). In a specific embodiment, some of the cells of the central cushioning area may be completely closed, while other cells may be partially closed (e.g., with openings through a membrane, etc.) to impart the central cushioning area with breathability through its thickness. The closed ends of such a central cushioning area may provide a surface that is capable of supporting portions of the second cushioning element that are disposed thereover.

The first and second cushioning elements of a composite cushion according to this disclosure may provide the essential elements of a cushion, or they may serve as a base for an even larger composite cushion. In a specific embodiment, a cushion comprising a bladder filled with a deformable material that includes acrylic microspheres dispersed throughout or held together by a viscous material may be positioned over a base that comprises a composite cushion with first and second cushioning elements, as disclosed herein.

In another aspect, methods for fabricating, or making, composite cushions are disclosed. Such a method includes forming a first cushioning element from a first cushioning material. The first cushioning element is formed to include walls. The walls define columnar cushioning cells in a central cushioning area and engagement features in a peripheral engagement area, with the peripheral engagement area being located adjacent to at least a portion of an outer periphery of the central cushioning area. The engagement features may include engagement cells, flanges, or other structures that protrude from the outer periphery of the central cushioning area.

A second cushioning element of the composite cushion is formed with a second cushioning material. As the second cushioning element is formed, portions of the second cushioning element may be defined that include shapes that complement the shapes of the engagement features of the peripheral engagement area of the first cushioning element. In embodiments where the engagement features comprise engagement cells, the second cushioning material may be introduced into and through the engagement cells to lock the second cushioning element onto the first cushioning element. In embodiments where the engagement features comprise flanges or other structures, the second cushioning element may form around and extend into recesses of the flanges, locking the second cushioning element onto the flanges.

The first cushioning element may be formed by a variety of suitable processes, including by the use of molds (e.g., by injecting the first cushioning material (e.g., a gel, etc.) into a mold, etc.). Once a first cushioning element has been formed, it may be placed into another mold. In some embodiments, a relief layer may be applied to at least a portion of the first cushioning element. The relief layer may be placed on the first cushioning element without adhering to or otherwise being secured to the first cushioning element. With the first cushioning element and any relief layer(s) in the mold, the second cushioning material (e.g., a rise in place foam, etc.) may be introduced into (e.g., injected, etc.) the mold to form the second cushioning element, including any engagement features thereof, laterally adjacent to at least a portion of the first cushioning element. In embodiments where the second cushioning material is applied directly to the central cushioning area of the first cushioning element and the second cushioning material enters into cells of the central cushioning area, the second cushioning material may be removed from those cells after the second cushioning element has been formed.

Other aspects, as well as features and advantages of various aspects of the disclosed subject matter will become apparent to those of ordinary skill in the art through consideration of the ensuing description, the accompanying drawings, and the appended claims.

DETAILED DESCRIPTION

Figure 1:
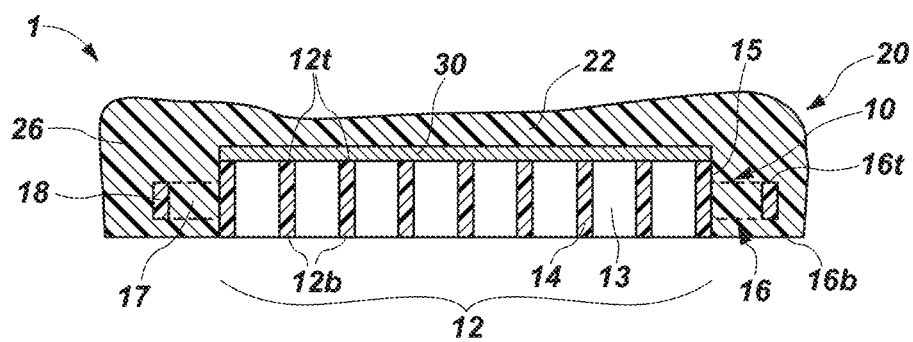
FIG. 1 is a cross-sectional representation of an embodiment of a composite cushion according to this disclosure, showing embodiments of a first cushioning element that of the composite cushion and a second cushioning element that at least partially surrounds a periphery of the first cushioning element and that at least partially covers a top surface of the first cushioning element.

With reference to FIG. 1, an embodiment of a composite cushion 1 according to this disclosure is depicted. The composite cushion 1 includes a first cushioning element 10 and a second cushioning element 20.

Figure 2:
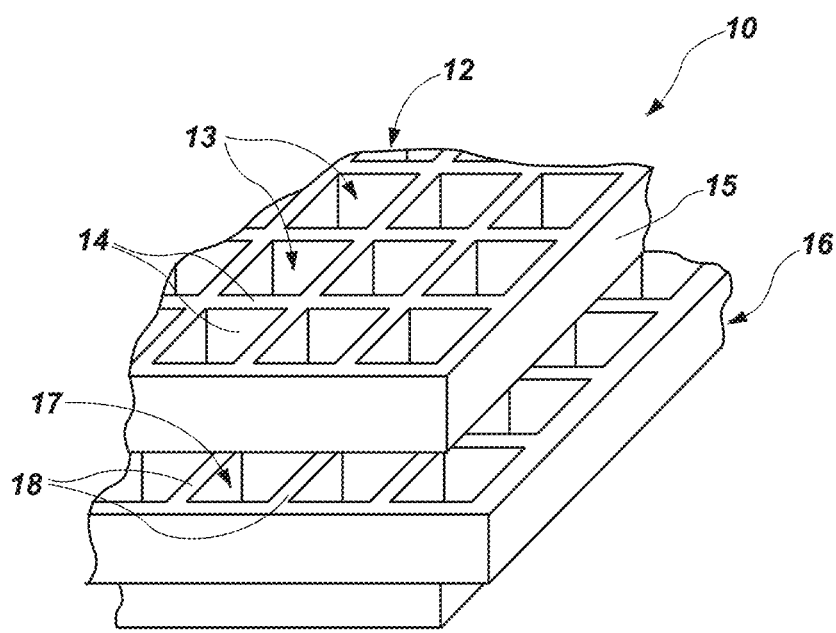
FIG. 2 is a partial perspective view of the first cushioning element of the composition cushion shown in FIG. 1, in which a peripheral engagement area of the first cushioning element has a stepped configuration relative to an outer periphery of a central cushioning area of the first cushioning element.

As FIG. 1 and FIG. 2 depict, the first cushioning element 10 includes a central cushioning area 12 and a peripheral engagement area 16. The central cushioning area 12 includes a top surface 12*t* and a bottom surface 12*b*. A plurality of cells 13 may extend substantially through the central cushioning area 12, between the top surface 12*t* and the bottom surface 12*b*. The cells 13, which may be arranged in an array, are defined by side walls 14, which may be formed from a compressible, resilient material. Together, the configurations of the cells 13 and the side walls 14 that define the cells 13, the arrangement of the cells 13, and the material from which the side walls 14 are formed may provide a plurality of so-called "buckling columns" in the central cushioning area 12. In some embodiments, the side walls 14 that define a cell 13 may buckle independently from the side walls 14 that define non-adjacent, or distant, cells 13.

The peripheral engagement area 16 is located adjacent to, and protrudes from, at least a portion of an outer periphery 15 of the central cushioning area 12. In some embodiments, the peripheral engagement area 16 may surround a portion of the central cushioning area 12. In other embodiments, the peripheral engagement area 16 may completely surround the central cushioning area 12.

Like the central cushioning area 12, the peripheral engagement area 16 of the first cushioning element 10 may include a plurality of cells 17 that are defined by side walls 18 and that extend between a top surface 16*t* and a bottom surface 16*b* of the peripheral engagement area 16. A top end 17*t* of each cell 17 may be open.

FIGS. 1 and 2 depict an embodiment of first cushioning element 10 in which the peripheral engagement area 16 is shorter or thinner than the central cushioning area 12. The peripheral engagement area 16 of that embodiment is stepped, or recessed, relative to the outer periphery 15 of the central cushioning area 12. More specifically, the top surface 16*t* of the peripheral engagement area 16 is at a different elevation than the top surface 12*t* of the central cushioning area 12 and the bottom surface 16*b* of the peripheral engagement area 16 is stepped up relative to the bottom surface 12*b* of the central cushioning area 12. Such a configuration results in a peripheral engagement area 16 with outer edges that are shorter than a thickness of an outer periphery 15 of the central cushioning area 12, enabling the second cushioning element 20 to lock onto the first cushioning element 10 without being thicker than the first cushioning element 10. Alternatively, the top surface 16*t* of the peripheral engagement area 16 may be stepped down relative to the top surface 12*t* of the central cushioning area 12 while the bottom surfaces 16*b* and 12*b* of the peripheral engagement area 16 and the central cushioning area 12, respectively, are coplanar, or the bottom surface 16*b* of the peripheral engagement area 16 may be stepped up relative to the bottom surface 12*b* of the central cushioning area 12 while the top surfaces 16*t* and 12*t* of the peripheral engagement area 16 and the central cushioning area 12, respectively, are coplanar.

With continued reference to FIG. 1, in addition to the first cushioning element 10 and the second cushioning element 20, the composite cushion 1 includes a relief layer 30. The relief layer 30 is positioned on at least a portion of the top surface 12*t* of the central cushioning area 12 of the first cushioning element 10. The relief layer 30 may be positioned on the top surface 12*t* of the central cushioning area 12 without being secured to the top surface 12*t*. Alternatively, the relief layer 30 (e.g., one or more peripheral portions thereof, one or more central portions thereof, etc.) may be secured to the top surface 12*t* of the central cushioning area 12 while a remainder of the relief layer 30 (e.g., a majority of the portions of the relief layer 30 that contact the top surface 12*t*, etc.) may remain unsecured to the top surface 12*t*.

Peripheral portions 26 of the second cushioning element 20 at least partially surround the first cushioning element 10. In addition, the peripheral portions 26 of the second cushioning element 20 engage the peripheral engagement area 16 of the first cushioning element 10. More specifically, a material of the peripheral portions 26 of the second cushioning element 20 extends through cells 17 in the peripheral engagement area 16 of the first cushioning element 10 to interlock the peripheral portion 26 of the second cushioning element 20 to the peripheral engagement area 16 of the first cushioning element 10.

A central portion 22 of the second cushioning element 20 covers the relief layer 30 on the top surface 12*t* of the central cushioning area 12 of the first cushioning element 10. Such an arrangement may enable central superimposed portions of the first cushioning element 10 and the second cushioning element 20 to function somewhat independently from one another and without significant interference from one another. As an example, while the second cushioning element 20 located over the central cushioning area 12 of the first cushioning element 10 provides substantially constant cushioning and resistance without interfering with the ability of the central cushioning area 12 of the first cushioning element 10 to collapse under focused forces, while providing support to distributed forces.

Figure 3:
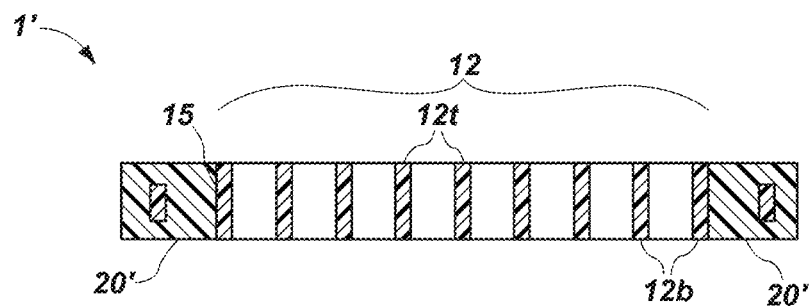
FIG. 3 is a cross-sectional representation of another embodiment of composite cushion that includes the first cushioning element of FIG. 1, with a second cushioning element that at least partially surrounds a periphery of the first cushioning element.
Figure 4:
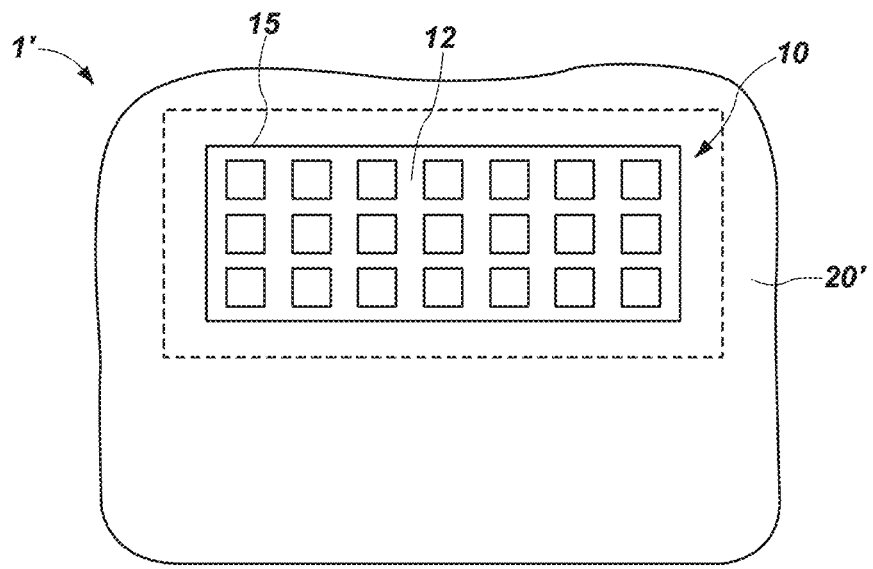
FIG. 4 is a top view of the composite cushion of FIG. 3.

FIGS. 3 and 4 illustrate an embodiment of a composite cushion 1' that includes a first cushioning element 10 and a second cushioning element 20' with substantially the same thickness, or height. Thus, neither the top surface 12*t* nor the bottom surface 12*b* of the central cushioning area 12 of the first cushioning element 10 is covered any portion of the second cushioning element 20'; both of these major surfaces remain exposed. The second cushioning element 20' extends around an entire outer periphery 15 of the central cushioning area 12 of the first cushioning element 10, which may define a structure such as that shown in FIG. 3 or a laterally thinner "racetrack" structure around the first cushioning element 10.

Figure 5:
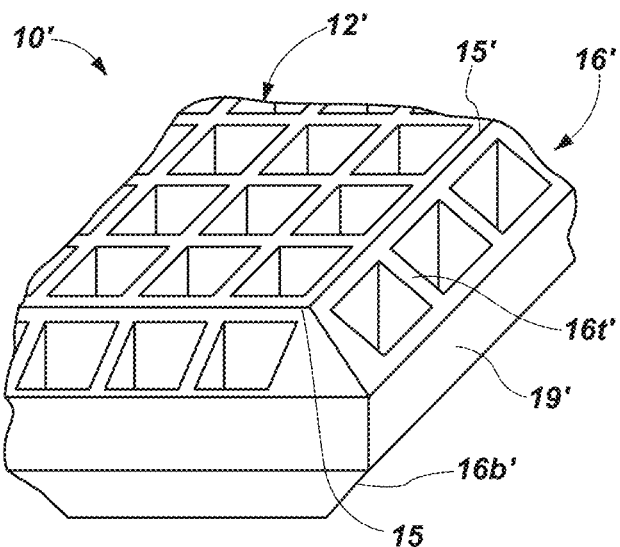
FIG. 5 is a partial perspective view of another embodiment of first cushioning element, in which a peripheral engagement area of the first cushioning element tapers downward from an outer periphery of a central cushioning area of the first cushioning element.
Figure 6:
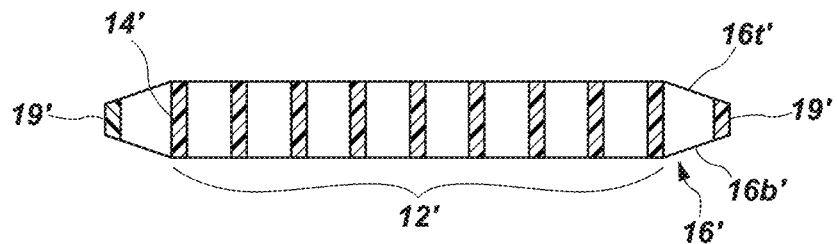
FIG. 6 is a cross-sectional representation of the embodiment of the first cushioning element shown in FIG. 5.

Turning now to FIGS. 5 and 6, another embodiment of first cushioning element 10' is illustrated. The first cushioning element 10' includes a central cushioning area 12' and a peripheral engagement area 16'. In some embodiments, the central cushioning area 12' may include the same features as the central cushioning area 12 of the embodiment of first cushioning element 10 depicted by FIGS. 1 and 2.

The peripheral engagement area 16' is located adjacent to at least a portion of an outer periphery 15' of the central cushioning area 12'. Rather than have a stepped, or recessed, configuration like the peripheral engagement area 16 of the embodiment of first cushioning element 10 depicted by FIGS. 1 and 2, the peripheral engagement area 16' of the first cushioning element 10' illustrated by FIGS. 5 and 6 may include top and bottom surfaces 16*t*' and 16*b*', respectively, that are tapered in such a way that outer edges 19' of the peripheral engagement area 16' are shorter than a thickness of the central cushioning area 12' at an outer periphery 15' thereof.

Figure 7:
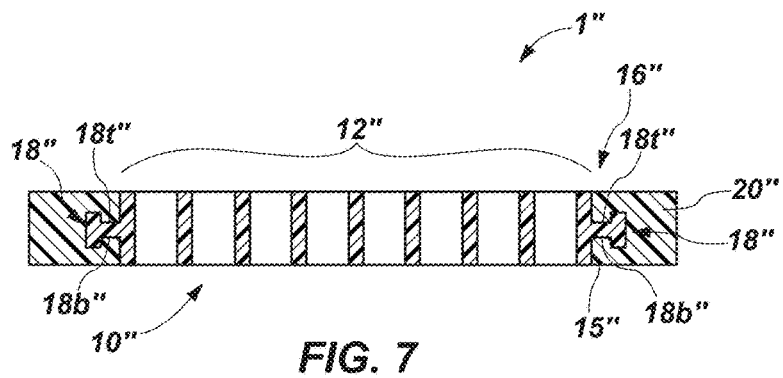
FIG. 7 is a cross-sectional representation of yet another embodiment of composite cushion, including yet another embodiment of first cushioning element, in which a peripheral engagement area of the first cushioning element comprises flanges that protrude from an outer periphery of a central cushioning area of the first cushioning element.

FIG. 7 provides a cross-sectional representation of another embodiment of first cushioning element 10" and of a composite cushion 1" of which the first cushioning element 10" is a part. The embodiment of first cushioning element 10" shown in FIG. 7 includes a peripheral engagement area 16" with one or more flanges 18" that protrude from an outer periphery 15" of central cushioning area 12" of the first cushioning element 10". Each flange 18" defines recesses, including a top recess 18*t*" that faces upwardly and a bottom recess 18*b*" that faces downwardly. The top recess 18*t*" and the bottom recess 18*b*" may receive the material of a second cushioning element 20", as shown, thus enabling the second cushioning element 20" to engage, or lock onto, the first cushioning element 10". In some embodiments, the peripheral engagement area 16" of the cushioning element 10" may comprise a single flange 18" that extends along a portion of the outer periphery 15" of the central cushioning area 12" of the first cushioning element 10" that is to receive a second cushioning element 20" (e.g., along a portion of the outer periphery 15", around an entirety of the outer periphery 15", etc.). In other embodiments, the peripheral engagement area 16" may comprise a plurality of discrete flanges 18" positioned along at least a portion of the outer periphery 15". Discrete flanges 18" may be short and/or elongated. In some embodiments, discrete flanges 18" may extend around corners of the outer periphery 15" of the central cushioning area 12" of the first cushioning element 10".

Figure 8:
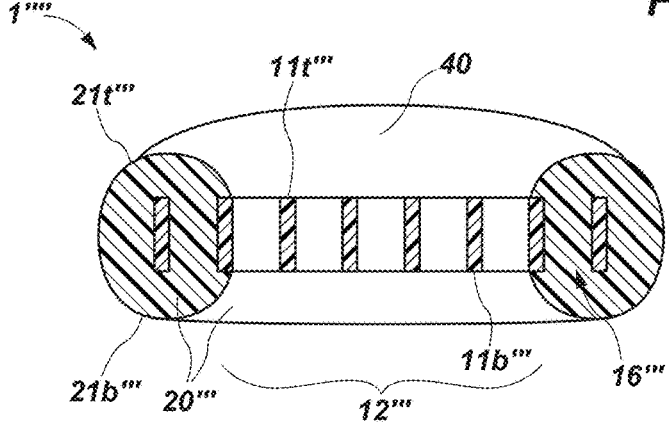
FIG. 8 is a cross-sectional representation of a cushioning system that includes still another embodiment of a composite cushion according to this disclosure, as well as a third cushioning element that has been assembled with the composite cushion.

FIG. 8 depicts, in cross-section, another embodiment of composite cushion 1'" in which the peripheral engagement area 16'" has a same thickness as the central cushioning area 12'". A thickness of the second cushioning element 20'" exceeds a thickness of the first cushioning element 10'", with the top surface 21*t*'" of the second cushioning element 20'" being located at a higher elevation than the top surface 11*t*'" of the first cushioning element 10'" and the bottom surface and 21*b*'" of the second cushioning element 20'" being located at a lower elevation than the bottom surface 11*b*''' of the first cushioning element 10'''.

In addition, the composite cushion 1' shown in FIG. 8 includes a third cushioning element 40, which is positioned on at least the first cushioning element 10''' and, optionally, on the second cushioning element 20'''.

Figure 9:
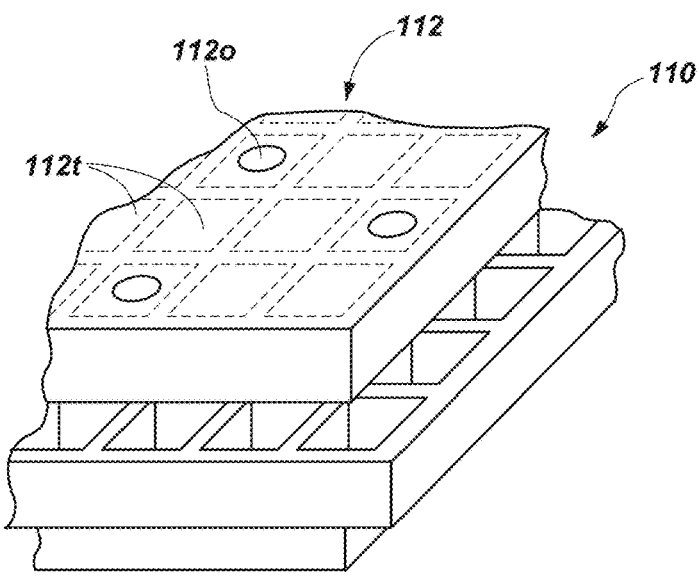
FIG. 9 is a partial perspective view of another embodiment of first cushioning element, in which ends of cells of a central cushioning area are at least partially closed.
Figure 10:
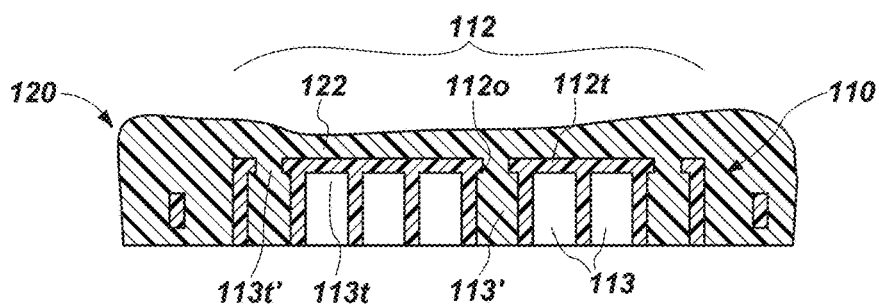
FIG. 10 is a cross-sectional representation of an embodiment of composite cushion that includes an embodiment of first cushioning element that includes a central cushioning area with cells that have ends that are at least partially closed.

In the embodiments of first cushioning elements 10, 10', 10'', and 10''' depicted by FIGS. 1-8, their central cushioning areas 12, 12', 12'', and 12''' include open-ended cells (e.g., cells 13 shown in FIGS. 1 and 2). As an alternative, as shown in FIGS. 9 and 10, the central cushioning area 112 of a first cushioning element 110 may include a top surface 112*t* that comprises a membrane that extends at least partially over at least some cells 113. In the depicted embodiment, the membrane that defines the top surface 112*t* of the central cushioning area 112 may completely cover the top ends 113*t* of some cells 113 and partially cover the top ends 113*t*' of other cells 113'. Thus, openings 112*o* may extend through some locations of the membrane that defines the top surface 112*t*.

As FIG. 10 shows, during formation of a second cushioning element 120 with a central portion 122 that at least partially overlaps, or that is at least partially superimposed over, the central cushioning area 112 of the first cushioning element 110, material from which the second cushioning element 120 is formed may be introduced into through openings 112*o* in the top surface 112*t* and into their respective cells 113'. That material may be subsequently removed from the cells 113'.

Any embodiment of first cushioning element 10, 10', 10'', 10''', 110 (FIGS. 1-10) may be formed by any of a variety of suitable processes, including, but not limited to, the use of molds (e.g., by injecting the first cushioning material (e.g., a gel, etc.) into a mold, etc.). Once a first cushioning element 10, 10', 10'', 10''', 110 has been formed, it may be placed into another mold. In some embodiments, a relief layer 30 (FIG. 1) may be applied to at least a portion of the top surface 12*t* (FIG. 1) of the central cushioning area 12, 12', 12'', 12''' of the first cushioning element 10, 10', 10'', 10''' (FIGS. 1-8). The relief layer 30 may be placed on the central cushioning area 12, 12', 12'', 12' of the first cushioning element 10, 10', 10'', 10' without adhering to or otherwise being secured to the top surface 12*t*.

With the first cushioning element 10, 10', 10'', 10''', 110 (FIGS. 1-10) and any relief layer 30 (FIG. 1) in the mold, a second cushioning material (e.g., a rise in place foam, etc.) may be introduced into (e.g., injected, etc.) the mold to form the second cushioning element 20, 20', 20'', 20''', 120 (FIGS. 3, 4, 7, 8 and 10), including any engagement features thereof, laterally adjacent to at least a portion of the first cushioning element 10, 10', 10'', 10''', 110. In embodiments such as that depicted by FIGS. 9 and 10 where the second cushioning material is applied directly to the top surface 112*t* of the central cushioning area 112 of the first cushioning element 110 and the second cushioning material enters into cells 113' of the central cushioning area 112, the second cushioning material may be removed from those cells 113' after the second cushioning element 120 has been formed.

Although the preceding disclosure provides many specifics, these should not be construed as limiting the scope of any of the ensuing claims. Other embodiments may be devised which do not depart from the scopes of the claims. Features from different embodiments may be employed in combination. The scope of each claim is, therefore, indicated and limited only by its plain language and the full scope of available legal equivalents to its elements.

What is claimed:

1. A composite cushioning element, comprising:
    a first cushioning element including:
        a central cushioning area having a first surface, a second surface, and an outer periphery; and
        a peripheral engagement area located outside of and adjacent to at least a portion of the outer periphery of the central cushioning area and having a first surface, a second surface, walls extending between the first surface and the second surface of the peripheral engagement area, and engagement cells extending between the first surface and the second surface of the peripheral engagement area; and
    a second cushioning element adjacent to at least a portion of the outer periphery of the central cushioning area of the first cushioning element and including portions formed complementarily to the peripheral engagement area of the first cushioning element to mechanically secure the second cushioning element to the first cushioning element.

2. The composite cushioning element of claim 1, wherein the first cushioning element comprises a first cushioning material and the second cushioning element comprises a second cushioning material.

3. The composite cushioning element of claim 2, wherein the first cushioning material enables walls and columnar cushioning cells of the central cushioning area of the first cushioning element to buckle.

4. The composite cushioning element of claim 2, wherein the second cushioning material comprises a foamed cushioning material.

5. The composite cushioning element of claim 1, wherein portions of the second cushioning element extend into the engagement cells of the peripheral engagement area of the first cushioning element to mechanically secure the second cushioning element to the first cushioning element.

6. The composite cushioning element of claim 1, wherein the central cushioning area of the first cushioning element has a central cushion thickness and the peripheral engagement area of the first cushioning element has an engagement thickness.

7. The composite cushioning element of claim 6, wherein the engagement thickness is the same as the central cushion thickness.

8. The composite cushioning element of claim 6, wherein the central cushion thickness exceeds the engagement thickness.

9. The composite cushioning element of claim 1, wherein at least one of the first surface of the peripheral engagement area of the first cushioning element and the second surface of the peripheral engagement area of the first cushioning element is oriented at an angle relative to a corresponding surface of the central cushioning area of the first cushioning element to impart the peripheral engagement area with a narrowing taper from the outer periphery of the central cushioning area to an outer peripheral edge of the peripheral engagement area.

10. The composite cushioning element of claim 1, wherein the second cushioning element covers the first surface of the peripheral engagement area of the first cushioning element.

11. The composite cushioning element of claim 10, wherein the second cushioning element covers the second surface of the peripheral engagement area of the first cushioning element.

12. The composite cushioning element of claim 10, wherein the second cushioning element covers at least a portion of the first surface of the central cushioning area of the first cushioning element.

13. The composite cushioning element of claim 12, further comprising:
a relief layer between superimposed portions of the second cushioning element and the central cushioning area of the first cushioning element.

14. The composite cushioning element of claim 13, wherein the relief layer is not adhered to or directly secured to a majority of the first surface of the central cushioning area of the first cushioning element.

15. A method for fabricating a cushion, comprising:
forming a first cushioning element comprising a central cushioning area and engagement features in a peripheral engagement area adjacent to an outer periphery of the central cushioning area; and
positioning the first cushioning element into a mold;
forming a second cushioning element, including:
introducing a cushioning material into the mold and onto at least portions of the first cushioning element; and
forming the cushioning material to a shape complementary to shapes of the engagement features in the peripheral engagement area of the first cushioning element to define engagement elements of the second cushioning element.

16. The method of claim 15, wherein forming the second cushioning element includes applying the cushioning material over at least a portion of the central cushioning area of the first cushioning element.

17. The method of claim 16, further comprising:
positioning a relief layer over at least a portion of the central cushioning area of the first cushioning element before forming the second cushioning element without adhering the relief layer to a majority of an upper surface of the central cushioning area.

18. The method of claim 15, wherein forming the first cushioning element comprises forming the first cushioning element with the engagement features of the peripheral engagement area comprising engagement cells.

19. The method of claim 18, wherein forming the cushioning material to the shape complementary to the shapes of the engagement features in the peripheral engagement area of the first cushioning element comprises introducing the cushioning material into and through the engagement cells of the peripheral engagement area of the first cushioning element.

20. A method for fabricating a cushion, comprising:
forming a first cushioning element comprising a central cushioning area and engagement cells in a peripheral engagement area adjacent to an outer periphery of the central cushioning area; and
forming a second cushioning element, including forming a cushioning material to a shape complementary to shapes of the engagement cells in the peripheral engagement area of the first cushioning element to define engagement elements of the second cushioning element.

\* \* \* \* \*